(12) United States Patent
Miyazaki et al.

(10) Patent No.: US 10,598,862 B2
(45) Date of Patent: Mar. 24, 2020

(54) OPTICAL MODULATOR

(71) Applicant: Sumitomo Osaka Cement Co., Ltd, Tokyo (JP)

(72) Inventors: Norikazu Miyazaki, Tokyo (JP); Yoichi Hosokawa, Tokyo (JP); Yuu Kataoka, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 15/941,024

(22) Filed: Mar. 30, 2018

(65) Prior Publication Data

US 2018/0284352 A1 Oct. 4, 2018

(30) Foreign Application Priority Data

Mar. 31, 2017 (JP) .................................. 2017-072888

(51) Int. Cl.
*G02B 6/32* (2006.01)
*G02B 6/27* (2006.01)
*G02F 1/225* (2006.01)
*G02F 1/21* (2006.01)
*G02B 6/30* (2006.01)

(52) U.S. Cl.
CPC ............. *G02B 6/32* (2013.01); *G02B 6/2773* (2013.01); *G02B 6/30* (2013.01); *G02F 1/225* (2013.01); *G02F 2001/212* (2013.01)

(58) Field of Classification Search
CPC .................................. G02B 6/32; G02F 1/225
See application file for complete search history.

(56) References Cited

U.S. PATENT DOCUMENTS

2015/0261060 A1* 9/2015 Miyazaki ................ G02F 1/225 385/3
2015/0378237 A1* 12/2015 Okamura .............. G02F 1/2255 385/3

FOREIGN PATENT DOCUMENTS

JP 5660095 B2 1/2015

* cited by examiner

*Primary Examiner* — Sung H Pak
*Assistant Examiner* — Hoang Q Tran
(74) *Attorney, Agent, or Firm* — IpHorgan Ltd.

(57) ABSTRACT

Provided is an optical element module including: a substrate; an optical modulator unit that is formed in the substrate and includes an optical waveguide; a first lens unit that is disposed on an end surface of the substrate, and includes a lens portion at which a signal light beam emitted from the optical modulator unit is collimated; and a second lens unit that introduces the signal light beam passing through the first lens unit to an optical fiber. The optical modulator unit includes a Mach-Zehnder type optical waveguide, a Y-branch coupler of the Mach-Zehnder type optical waveguide includes an output waveguide through which a signal light beam is guided, and a radiated light beam waveguide through which a radiated light beam is guided, and an unnecessary light beam removing unit, which suppresses input of a higher-order mode light beam propagating through the output waveguide or a leaked light beam propagating through the inside of the substrate into the optical fiber through the lens portions of the first lens unit, is provided between the output waveguide and the radiated light beam waveguide in the vicinity of an end of the substrate.

6 Claims, 6 Drawing Sheets

OPTICAL MODULATOR

CROSS-REFERENCE TO RELATED APPLICATIONS

This application claims the benefit of Japanese Patent Application No. 2017-072888 filed Mar. 31, 2017, the disclosure of which is herein incorporated by reference in its entirety.

BACKGROUND OF THE INVENTION

Field of the Invention

The present invention relates to an optical element module, and particularly to an optical element module that introduces signal light output from an optical modulator unit to an optical fiber by using a lens unit.

Description of Related Art

In a technical field such as an optical communication, an optical element module, which introduces signal light output from an optical modulator unit to an optical fiber by using a space optical system such as a lens unit, is used. In addition, so as to realize a wide bandwidth of the optical element module of an optical modulator, for example, there is suggested a configuration in which two signal light beams output from two optical modulator units as illustrated in FIG. 1 are combined into one light beam.

Description will be given for an overview of an optical element module illustrated in FIG. 1. An optical waveguide 2 is formed in a substrate 1 which is formed from lithium niobate and the like and has an electro-optic effect. In addition, in optical modulator units, an electrode is formed on the substrate along the optical waveguide 2, but the electrode is not illustrated in FIG. 1.

The optical waveguide 2 includes a Mach-Zehnder type optical waveguide (MZ1 or MZ2) in correspondence with each of the optical modulator units. In FIG. 1, an input light beam λ is branched into two light beams by a branched waveguide in the substrate, and the resultant branched light beams are respectively introduced to the Mach-Zehnder type optical waveguides.

A signal light beam (λ1 or λ2), which is modulated in an optical modulator unit including the Mach-Zehnder type optical waveguide (MZ1 or MZ2), is emitted from the substrate 1 and passes through a first lens unit 3 including two lenses. A plane of polarization of one of the two signal light beams is rotated by 90° by a wavelength plate 4, and the two signal light beams are combined by a combining unit 5, in which reflection or transmission units (51 and 52) such as a half mirror and a polarization beam splitter are combined, in a state in which planes of polarization of the two signal light beams are orthogonal to each other. The wavelength plate 4 and the combining unit 5 are collectively referred to as "polarization combining means". In addition, the signal light obtained after combining by the polarization combining means is input to an optical fiber 7 by a second lens unit including a condensing lens 6 and the like.

In addition, a Y-branch coupler of the Mach-Zehnder type optical waveguide (MZ1 or MZ2) is provided with an output waveguide through which a signal light beam is guided, and a radiated light beam waveguide (not illustrated) through which a radiated light beam is guided. The radiated light beam and the signal light beam have optical output characteristics opposite to each other, and it is possible to understand a state of the signal light beam by detecting the radiated light beam as a monitoring light beam.

As illustrated in FIG. 2, a phenomenon in which output curves with respect to a voltage applied to the optical modulator unit deviate from each other, and thus a bias point is shifted may occur between the signal light beam and the monitoring light beam. A control of an optical element such as an optical modulator may deviate from an optimal point due to the shift of the bias point, and the deviation becomes a cause for deterioration in quality of output signal from the optical element.

In a case of using a space optical system as illustrated in FIG. 1, the bias point shift phenomenon occurs more significantly in comparison to a case of so-called "butt joint" in which an optical fiber is directly connected to a substrate in which an output waveguide is formed. The reason for this is because higher-order mode light beams which are distributed in the vicinity of the output waveguide are likely to be coupled to each other by the optical fiber, and an unnecessary light beam after coupling causes an interference phenomenon with the signal light beam. Therefore, even when a positional relationship between the substrate 1 (optical waveguide such as the output waveguide 20) and the first lens unit 3, or a positional relationship of a fiber collimator 60, in which the second lens unit 6 and the optical fiber 7 are integrally configured, with respect to an optical axis of a signal light beam L slightly deviates, the unnecessary light beam is likely to be mixed into the signal light beam.

In addition, in a case of butt joint illustrated in FIG. 3 (refer to Japanese Patent No. 5660095), leaked light-removing means is disposed on both sides of the output waveguide to suppress introduction of the unnecessary light beam to the signal light beam. However, when applying the leaked light-removing means to the optical element module using the space optical system, the unnecessary light beam is likely to be rather introduced to the optical fiber.

The reason for this is because a light wave LK1 emitted from a radiated light beam waveguide (21 or 22) or a light wave LK2 emitted from leaked light-removing means (slab waveguide) 9 is condensed by a lens portion of a first lens unit 3, is input to a second lens unit 6 as an unnecessary light beam LK3, and is introduced to an optical fiber 7 as illustrated in FIG. 4. Particularly, the slab waveguide is used for the leaked light-removing means 9, and thus light beams emitted from the leaked light-removing means are diffused at a wide angle. This is a main cause for the above-described introduction of the unnecessary light beam.

In addition, in the optical element module provided with the polarization combining means illustrated in FIG. 1, two signal light beams are combined into one light beam. At this time, optical axes of the two signal light beams do not completely match each other due to a manufacturing error or amounting position error of the optical components. Therefore, alignment of the fiber collimator 60 is performed so that the loss of the entirety of the optical element module becomes minimal, and the loss difference between the two signal light beams (polarized waves) becomes the minimum. In this case, the fiber collimator 60 and the like may be disposed at a site that slightly deviates from the optical axes of the signal light beams. As a result, there is a problem that the bias point shift phenomenon further occurs. For example, in a case where a slight loss difference between the signal light beams exists in the optical waveguide, the above-described alignment is performed at a deviated position so that a loss of an output on a small loss side slightly increases in order for the loss difference to be the minimum in accordance with a fiber collimator position. As a result, the bias point shift phenomenon occurs.

SUMMARY OF THE INVENTION

An object of the invention is to solve the above-described problem and to provide an optical element module in which mixing of an unnecessary light beam is suppressed and occurrence of a bias point shift phenomenon is suppressed.

To accomplish the above-described object, the optical element module of the invention has the following technical characteristics.

(1) According to an aspect of the invention, there is provided an optical element module including: a substrate; an optical modulator unit that is formed in the substrate and includes an optical waveguide; a first lens unit that is disposed on an end surface of the substrate, and includes a lens portion at which a signal light beam emitted from the optical modulator unit is collimated; and a second lens unit that introduces the signal light beam passing through the first lens unit to an optical fiber. The optical modulator unit includes a Mach-Zehnder type optical waveguide. A Y-branch coupler of the Mach-Zehnder type optical waveguide includes an output waveguide through which a signal light beam is guided, and a radiated light beam waveguide through which a radiated light beam is guided. An unnecessary light beam removing unit, which suppresses input of a higher-order mode light beam propagating through the output waveguide or a leaked light beam propagating through the inside of the substrate into the optical fiber through the lens portions of the first lens unit, is provided between the output waveguide and the radiated light beam waveguide in the vicinity of an end of the substrate.

(2) According to another aspect of the invention, there is provided an optical element module including: a substrate; two optical modulator units which are formed in the substrate and respectively include an optical waveguide; a first lens unit that is disposed on an end surface of the substrate, and includes two lens portions at which two signal light beams emitted from the two optical modulator units are collimated; polarization combining means that combines the two signal light beams passing through the first lens unit in a state in which planes of polarization are orthogonal to each other; and a second lens unit that introduces a signal light beam obtained after combination by the polarization combining means to an optical fiber. Each of the optical modulator units includes a Mach-Zehnder type optical waveguide. A Y-branch coupler of the Mach-Zehnder type optical waveguide includes an output waveguide through which a signal light beam is guided, and a radiated light beam waveguide through which a radiated light beam is guided. An unnecessary light beam removing unit, which suppresses input of a higher-order mode light beam propagating through the output waveguide or a leaked light beam propagating through the inside of the substrate into the optical fiber through the lens portions of the first lens unit, is provided between the output waveguide and the radiated light beam waveguide in the vicinity of an end of the substrate.

(3) In the optical element module according to (1) or (2), the unnecessary light beam removing unit may be a slab waveguide that is formed on the substrate.

(4) In the optical element module according to (3), the slab waveguide may be formed to be spaced away from the output waveguide toward the end surface of the substrate.

(5) In the optical element module according to (3) or (4), a light absorbing unit may be disposed on an upper side of the slab waveguide.

(6) In the optical element module according to any one of (1) to (5), the substrate may be a thin plate having a thickness of 20 µm or less.

The optical element module of the invention includes a substrate; an optical modulator unit that is formed in the substrate and includes an optical waveguide; a first lens unit that is disposed on an end surface of the substrate, and includes a lens portion at which a signal light beam emitted from the optical modulator unit is collimated; and a second lens unit that introduces the signal light beam passing through the first lens unit to an optical fiber. The optical modulator unit includes a Mach-Zehnder type optical waveguide. A Y-branch coupler of the Mach-Zehnder type optical waveguide includes an output waveguide through which a signal light beam is guided, and a radiated light beam waveguide through which a radiated light beam is guided. An unnecessary light beam removing unit, which suppresses input of a higher-order mode light beam propagating through the output waveguide or a leaked light beam propagating through the inside of the substrate into the optical fiber through the lens portions of the first lens unit, is provided between the output waveguide and the radiated light beam waveguide in the vicinity of an end of the substrate. Accordingly, it is possible to provide an optical element module in which mixing of an unnecessary light beam into signal light beams is suppressed, and occurrence of a bias point shift phenomenon is suppressed.

DETAILED DESCRIPTION OF THE INVENTION

Figure 5:
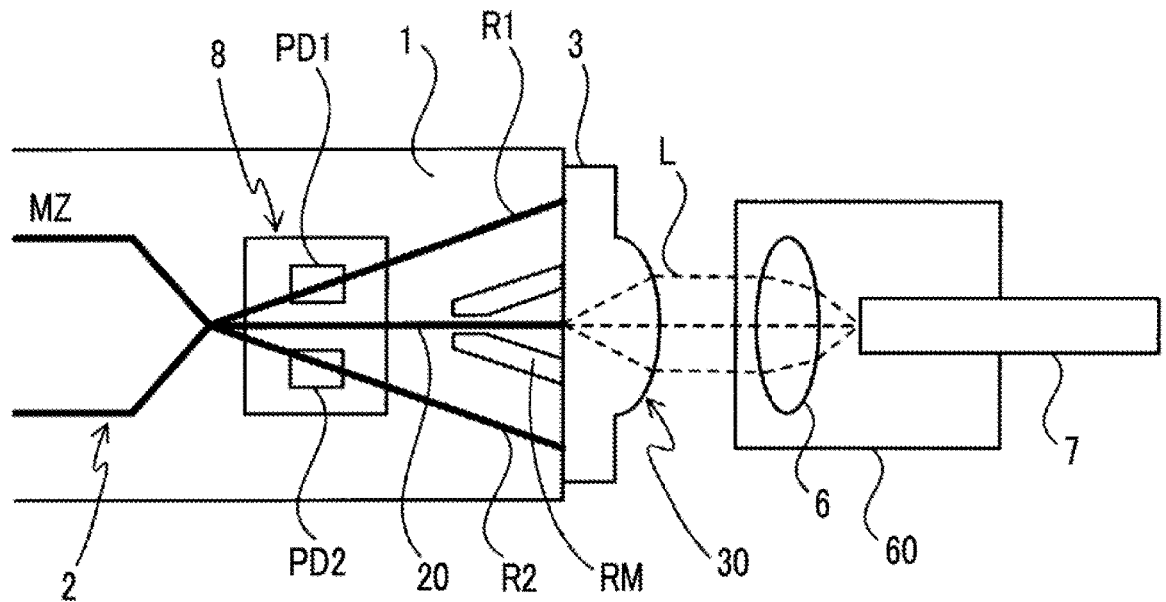
FIG. 5 is a view illustrating a first example of an optical element module of the invention.

Hereinafter, an optical element module of the invention will be described in detail with reference to appropriate examples. As illustrated in FIG. 5, the optical element module of the invention includes, a substrate 1, an optical modulator unit that is formed in the substrate and includes an optical waveguide, a first lens unit 3 that is disposed on an end surface of the substrate, and includes a lens portion 30 at which a signal light beam emitted from the optical modulator unit is collimated, and a second lens unit 6 that introduces the signal light beam passing through the first lens unit to an optical fiber 7. The optical modulator unit includes a Mach-Zehnder type optical waveguide MZ. A Y-branch coupler of the Mach-Zehnder type optical waveguide includes an output waveguide 20 through which a signal light beam is guided, and radiated light beam waveguides (R1 and R2) through which a radiated light beam is guided. An unnecessary light beam removing unit RM, which suppresses input of a higher-order mode light beam propagating through the output waveguide or a leaked light beam propagating through the inside of the substrate into the optical fiber 7 through the lens portions of the first lens unit 3, is provided between the output waveguide and the radiated light beam waveguide in the vicinity of an end of the substrate.

Figure 6:
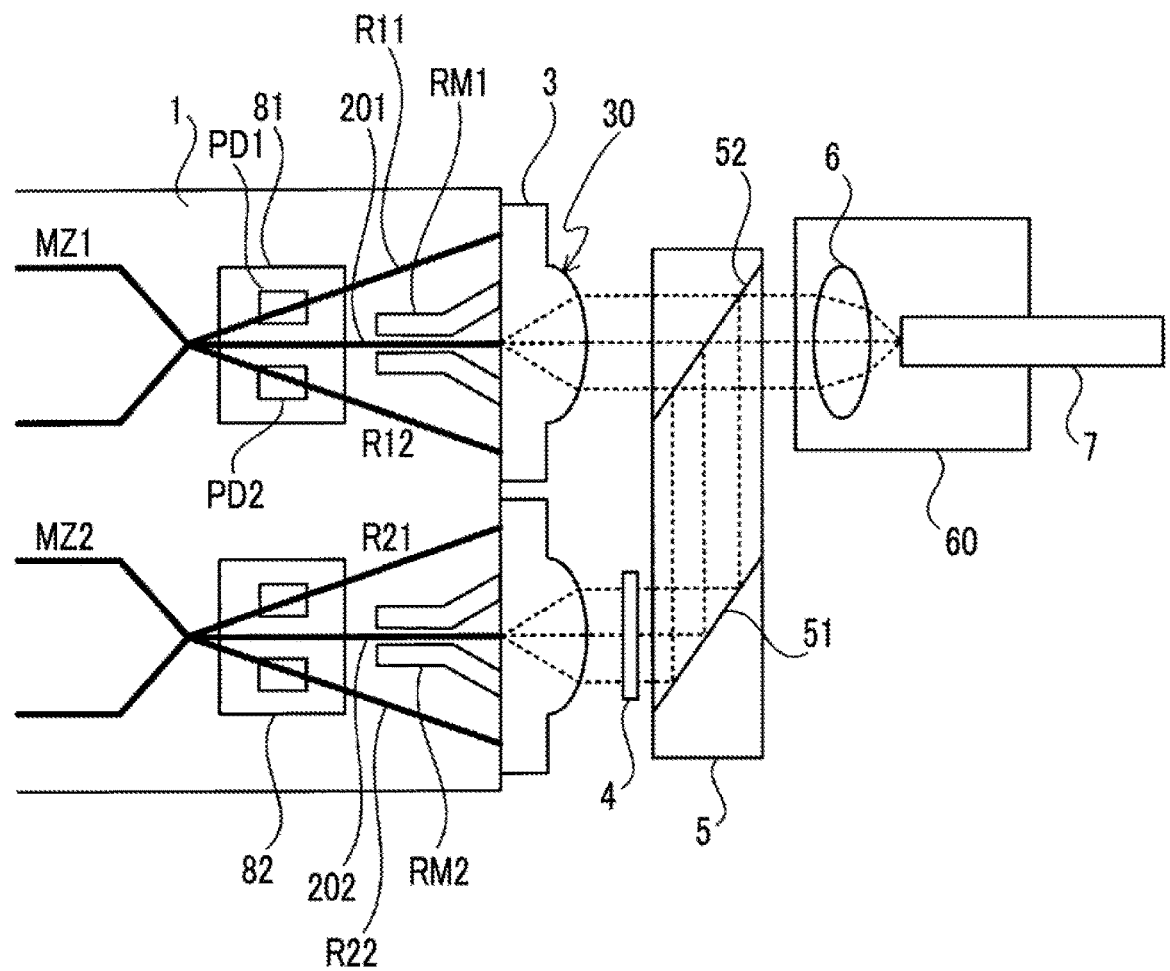
FIG. 6 is a view illustrating a second example of the optical element module of the invention.

In addition, in a case of an optical element module that performs polarization beam combining, as illustrated in FIG. 6, the optical element module includes a substrate 1, two optical modulator units which are formed in the substrate and respectively include an optical waveguide, a first lens unit 3 that is disposed on an end surface of the substrate, and includes two lens portions 30 which are integrally formed and at which two signal light beams emitted from the two optical modulator units are collimated, polarization combining means (4 and 5) that combines the two signal light beams passing through the first lens unit in a state in which planes of polarization are orthogonal to each other, and a second lens unit 6 that introduces a signal light beam obtained after combining by the polarization combining means to an optical fiber 7. Each of the optical modulator units includes a Mach-Zehnder type optical waveguide (MZ1 or MZ2). A Y-branch coupler of the Mach-Zehnder type optical waveguide includes an output waveguide (201 or 202) through which a signal light beam is guided, and radiated light beam waveguides (R11 and R12, or R21 and R22) through which a radiated light beam is guided. An unnecessary light beam removing unit (RM1 or RM2), which suppresses input of a higher-order mode light beam propagating through the output waveguide or a leaked light beam propagating through the inside of the substrate into the optical fiber through the lens portions of the first lens unit, is provided between the output waveguide and the radiated light beam waveguides in the vicinity of an end of the substrate.

As the substrate 1, a substrate that is formed from lithium niobate or lithium tantalate and has an electro-optic effect, or a semiconductor substrate can be used. Examples of a method of forming the optical waveguide include a method in which a high-refractive-index material such as titanium (Ti) is thermally diffused on the lithium niobate substrate (LN substrate), a proton exchange method, and the like. In addition, as in a ridge-type waveguide, the optical waveguide can be formed by forming unevenness in the substrate 1. In a case of the ridge-type waveguide, the substrate and the optical waveguide can be formed from a polymer. For example, a high-refractive-index polymer including a convex portion is disposed as a core portion, and a low-refractive-index polymer is disposed as a clad portion on the upper and lower sides of the core portion with the core portion interposed between the clad portions, thereby preparing a planar substrate including the optical waveguide.

In addition, it is not necessary to constitute the substrate 1 with one sheet of substrate. As indicated by a reference numeral 10 after division into two parts at a portion of one-dotted line X in FIG. 1, at a site such as a branched waveguide to which an electrical field is not applied, the substrate can be constituted of a planar optical circuit substrate (PLC) by using a substrate of quartz and the like.

In a case of using a substrate such as a lithium niobate substrate having a thickness of 20 μm or less, the optical element module of the invention exhibits a more significant effect. In a case of using a thin plate, for example, the thin plate is used by polishing an LN wafer in which a Ti-diffused waveguide is formed to 20 μm or less, and by fixing the LN wafer to a holding substrate through an adhesive. Furthermore, thinning of the substrate can be performed even after forming an electrode.

Although not illustrated, a modulation electrode or a phase shift electrode is disposed immediately above or in the vicinity of the Mach-Zehnder type optical waveguides (MZ, MZ1, and MZ2). The electrodes can be formed on an underlying layer of Ti and the like through electroplating of Au and the like.

Figure 1:
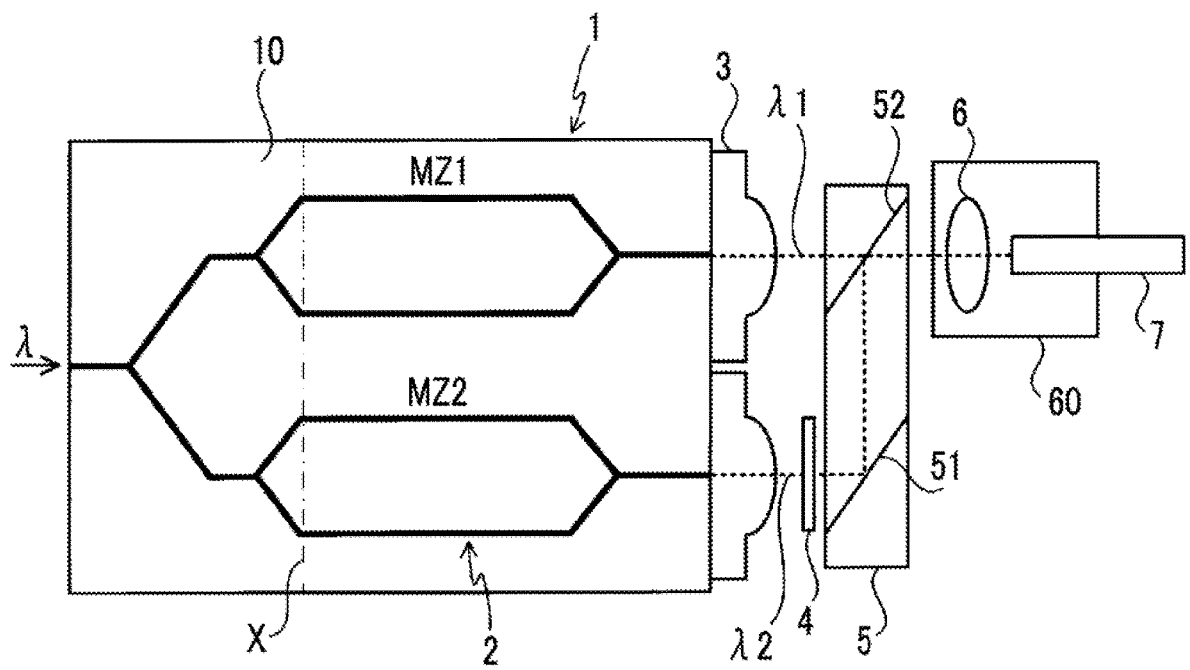
FIG. 1 is a schematic view illustrating an optical element module including polarization combining means in the related art.
Figure 2:
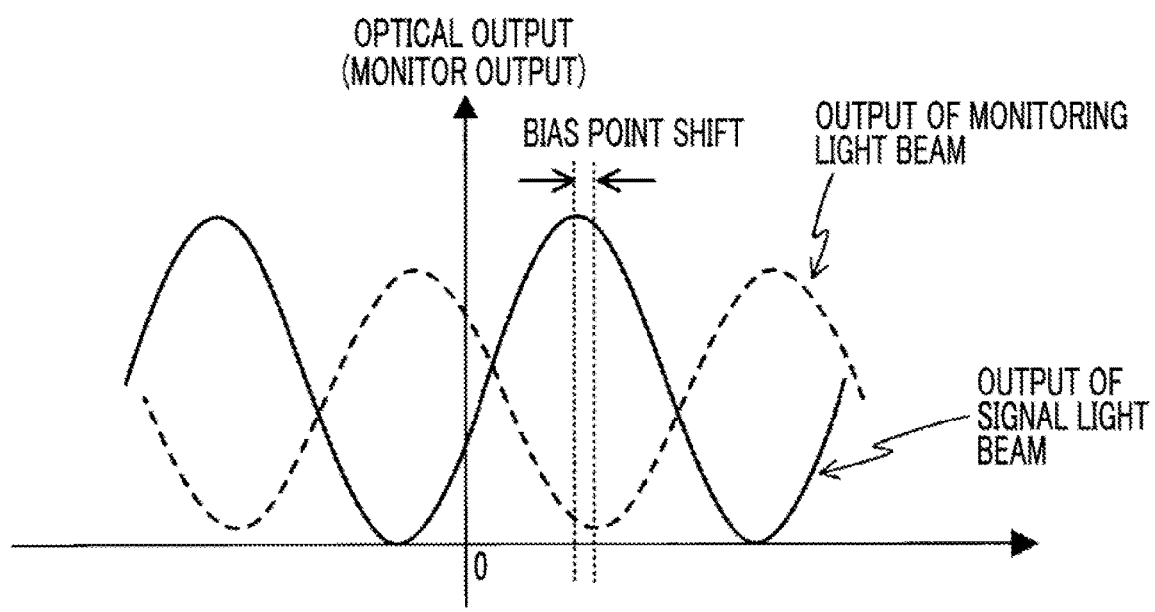
FIG. 2 is a view illustrating a phase variation between a signal light beam and a monitoring light beam in the related art.
Figure 3:
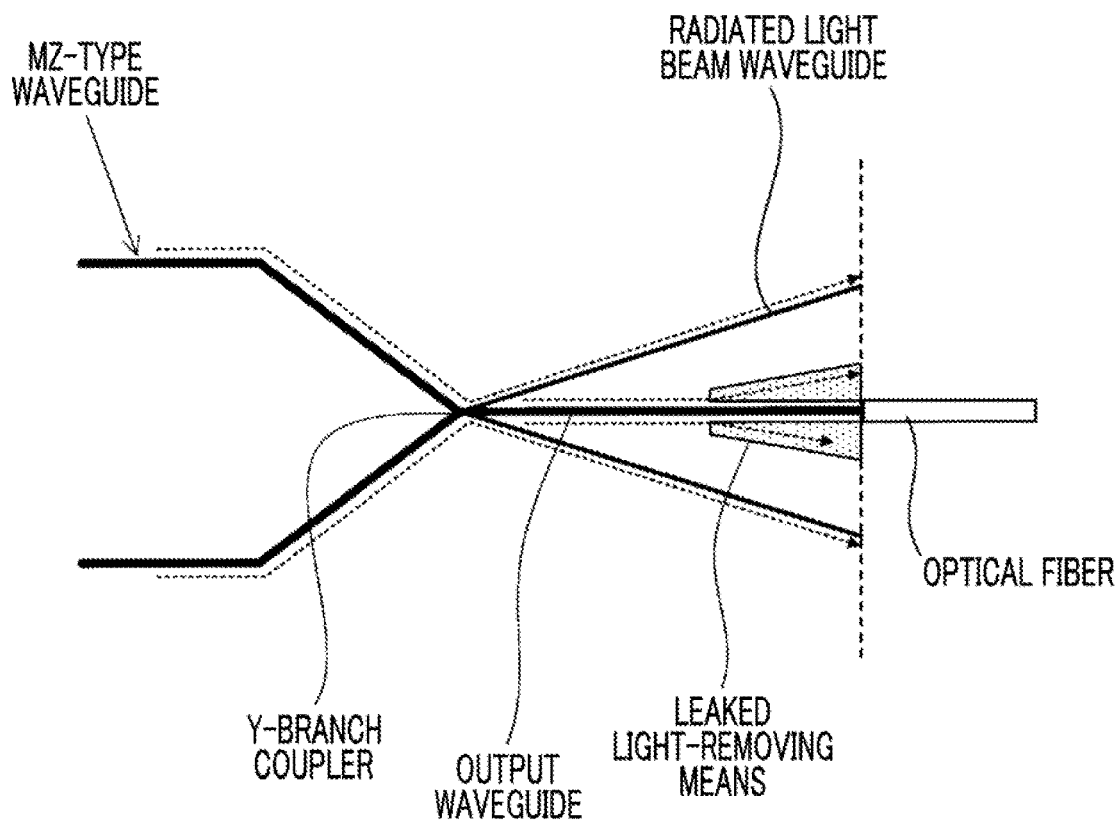
FIG. 3 is a view illustrating a method of removing a part of radiated light beams propagating along an output waveguide disclosed in Japanese Patent No. 5660095 in the related art.

In FIG. 6, the first lens unit 3, a wavelength plate 4 and reflecting units (51 and 52) such as a half mirror and a polarization beam splitter which constitute the polarization combining means, the second lens unit 6, the optical fiber 7 are the same as those in description with reference to FIG. 1, and thus description thereof will not be repeated. Furthermore, in FIG. 6, two lens portions 30 are formed as individual members, but the two lens portions 30 may be integrally formed. With regard to arrangement between an end surface of the substrate 1 and the first lens unit 3, the end surface and the first lens unit 3 may be arranged to come into direct contact with each other, or may be bonded with an optical adhesive. In addition, a film body such as a filter may be interposed between the end surface and the first lens unit 3.

Figure 4:
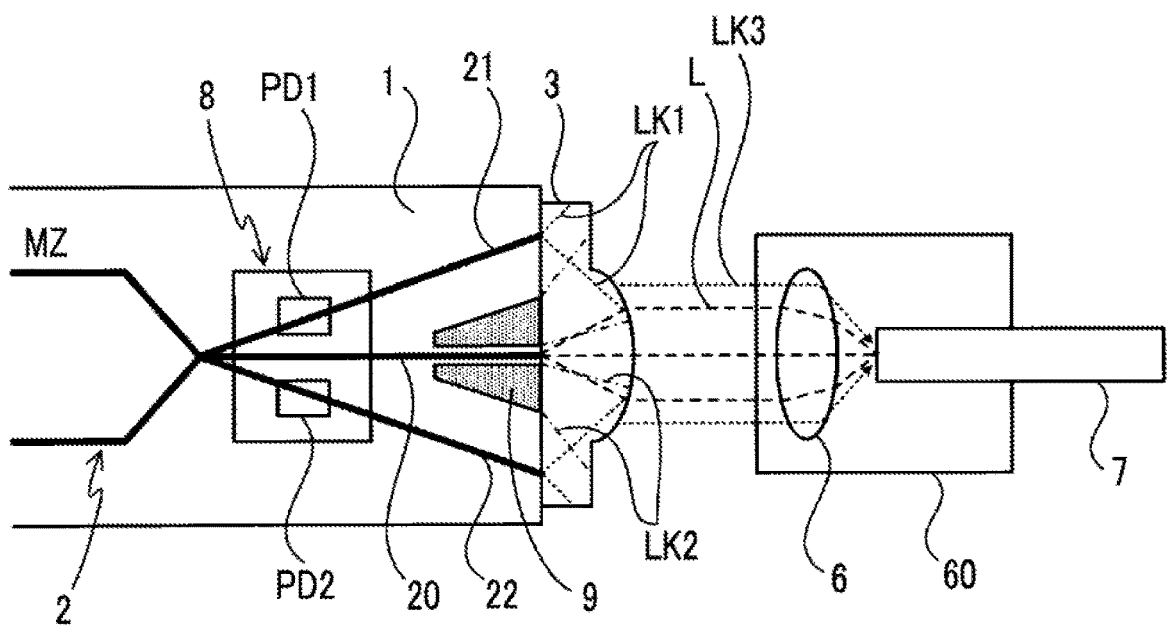
FIG. 4 is a view illustrating a problem in a case of using the leaked light-removing means in FIG. 3 in the related art.

In the optical element module of the invention as illustrated in FIG. 5 or FIG. 6, the radiated light beam waveguides (R1 and R2, R11 and R12, or R21 and R22) are formed in the Y-branch coupler of the Mach-Zehnder type optical waveguides (MZ, MZ1, or MZ2) with an output waveguide (20, 201, or 202) interposed therebetween similar to FIG. 4. One end of each of the radiated light beam waveguides is disposed to be connected to the Y-branch coupler or to be close thereto. A same-phase interference light beam in the Y-branch coupler of the Mach-Zehnder type optical waveguides becomes a main output light beam (signal light beam) and propagates through the output waveguide. In addition, a reverse-phase interference light beam (radiated light beam) propagates through the radiated light beam waveguide and is used as a monitoring light beam.

A light-receiving element (81 or 82) including light-receiving portions (PD1 and PD2) is disposed on the radiated light beam waveguide. In FIG. 5 or FIG. 6, two light-receiving portions are formed in one light-receiving element, but the light-receiving element may be constituted by light-receiving elements different from each other in correspondence with respective light-receiving portions. In addition, in FIG. 5 and FIG. 6, the radiated light beam waveguides are constituted of two optical waveguides. However, the Y-branch coupler may be set to include an output waveguide and one radiated light beam waveguide by using a coupler structure or an MMI structure, and may be configured by one optical waveguide and one light-receiving element.

The light-receiving element is disposed to be close to the radiated light beam waveguide, and thus a part of light waves propagating through the radiated light beam waveguide is drawn up toward the light-receiving element side and is input to the light-receiving portions (PD1 and PD2). Outputs of the two light-receiving portions are electrically combined, and then a monitor signal proportional to light intensity of a radiated light beam is output.

With regard to arrangement of the light-receiving elements, it is possible to employ a configuration in which the light-receiving elements are disposed on an outer side of the substrate 1 to detect a radiated light beam radiated from an end of the radiated light beam waveguide to the outside of the substrate without limitation to a method (on-chip type method) in which the light-receiving elements are disposed on the substrate as illustrated in FIG. 5 or FIG. 6.

In the optical element modules of the invention, the unnecessary light beam removing unit (RM, RM1, or RM2) is formed along the output waveguide (20, 201, or 202). The unnecessary light beam removing unit is preferably a slab waveguide that is formed on the substrate 1. The slab waveguide can be formed by the same method when forming an optical waveguide including the Mach-Zehnder type optical waveguide.

As illustrated in FIG. 5 or FIG. 6, the slab waveguide is disposed in the vicinity of the output waveguide, and is formed to be spaced away from the output waveguide (20, 201, or 202) toward an end surface (right direction in the drawings) of the substrate 1 in a light wave propagating direction. This is employed to realize a configuration in which a part (unnecessary light beam) of radiated light beams propagating through the output waveguide is guided through the slab waveguide, and then the unnecessary light beam radiated from the end of the slab waveguide is prevented from being input to the optical fiber 7 by using the lens portion 30.

As illustrated in FIG. 5, a shape of the slab waveguide, which constitutes the unnecessary light beam removing unit that is used in the invention, has a configuration in which a left end of the slab waveguide (RM) is close to the output waveguide 20, and a right end thereof is spaced away from the output waveguide. At a right end surface of the substrate 1, it is preferable that a gap between the output waveguide 20 and the slab waveguide RM is wider than a mode field diameter of the output waveguide 1.5 or more times, and more preferably 2 or more times. According to this, the unnecessary light beam is suppressed from returning again to the output waveguide.

In addition, as illustrated in FIG. 6, with regard to one end side (left end side in the drawing) of the slab waveguide (RM1 or RM2), the slab waveguide and the output waveguide (201 or 202) may be disposed so that a gap therebetween is set to a predetermined constant gap over a predetermined length and then the slab waveguide and the output waveguide are separated from each other. According to this, it is possible to draw an unnecessary light beam propagating through the output waveguide toward the slab waveguide side.

Figure 7:
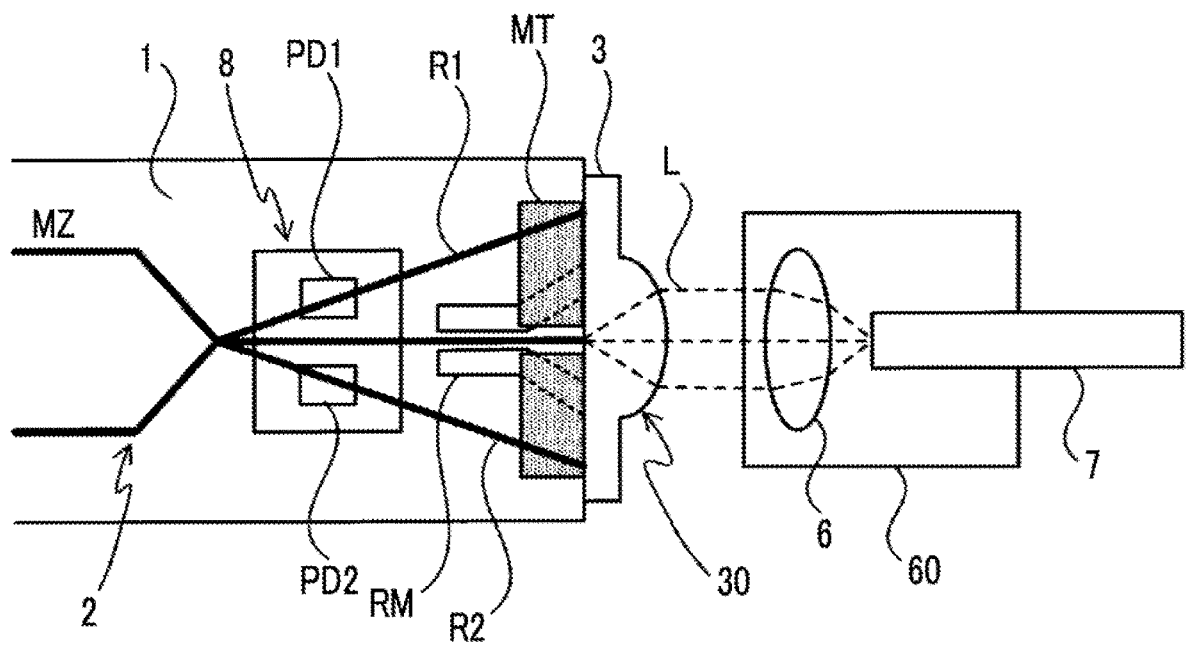
FIG. 7 is a view illustrating a third example of the optical element module of the invention.

In addition, as illustrated in FIG. 7, a light absorbing unit MT may be provided on the slab waveguide so as to reduce the unnecessary light beam emitted from the slab waveguide RM. As the light absorbing unit, a metal film or a metal chip, which is constituted of a metal material such as Au and Al, can be used. When the light absorbing unit is disposed on the slab waveguide, it is possible to realize a configuration in which the unnecessary light beam propagating through the slab waveguide is absorbed at a metal material portion of the light absorbing unit. In a case of the metal film, the metal film may be an electrode that can be formed when forming an electrode such as a modulation electrode and a DC bias electrode. In addition, it is also possible to dispose a high-refractive-index film, which has a refractive index higher than that of the slab waveguide, between the slab waveguide and the metal material portion so as to enhance unnecessary light beam absorbing efficiency with the metal material portion. In addition, the light absorbing unit MT in FIG. 7 can be provided on the slab waveguide (RM1 or RM2) or the radiated light beam waveguides (R11 and R12, or R21 and R22) in FIG. 6.

As illustrated in FIG. 7, to confirm an effect of the unnecessary light beam removing unit, phase difference (a bias point shift between modulation curves of a monitor signal and a signal light beam) or a deviation of the modulation curves has been investigated on the basis of whether or not to provide the unnecessary light beam removing unit RM or the light absorbing unit MT with respect to one Mach-Zehnder type optical waveguide (MZ).

Measurement has been performed with respect to a variation of a phase difference (refer to FIG. 9) and a deviation of modulation curves (refer to FIG. 10 and FIG. 11) in a case of moving a fiber collimator 60, in which a condensing lens 6 and the optical fiber 7 are integrally configured, in a direction perpendicular to an optical axis of a signal light beam L. In graphs in FIG. 9 to FIG. 11, a graph plotted with the symbol ◇ represents a state in which the unnecessary light beam removing unit RM and the light absorbing unit MT of the invention are not provided. In addition, a graph plotted with the symbol Δ represents a state in which the unnecessary light beam removing unit RM of the invention is provided.

Figure 9:
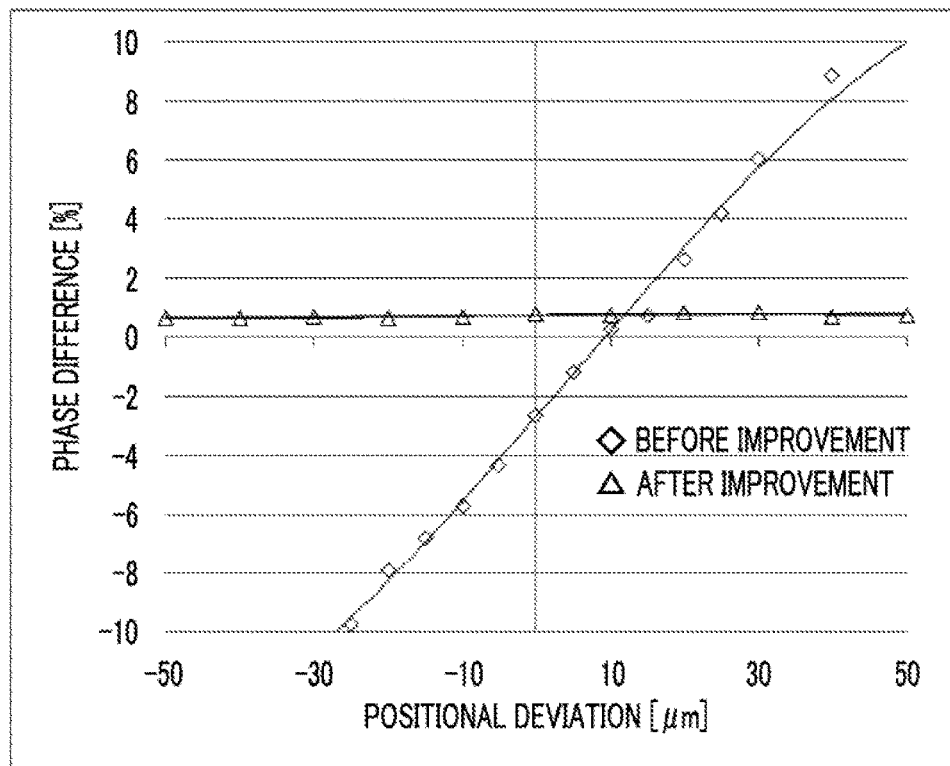
FIG. 9 is a graph illustrating a variation of a phase difference (bias shift) in a case where a fiber collimator position is set to deviate.

From FIG. 9, in a case where the unnecessary light beam removing unit and the light absorbing unit are not provided, it can be easily understood that a phase difference greatly varies as a positional deviation of the fiber collimator increases. In contrast, in a case where the unnecessary light beam removing unit is provided, the phase difference is approximately constant with respect to the positional deviation of the fiber collimator. That is, when the unnecessary light beam removing unit of the invention is provided, it can be understood that a bias point shift phenomenon according to a positional deviation of an optical component is effectively suppressed. Furthermore, when considering that it is possible to suppress the unnecessary light beam from entering the optical fiber through the first and second lens units with the unnecessary light beam removing unit, in a case where the light absorbing unit is added in addition to the unnecessary light beam removing unit, it is possible to expect a higher effect. That is, when the light absorbing unit is used in combination, it is also possible to suppress the unnecessary light beam removed at once from being emitted from one end of the slab waveguide, and thus it is possible to more effectively suppress the unnecessary light beam from entering the optical fiber.

Figure 8:
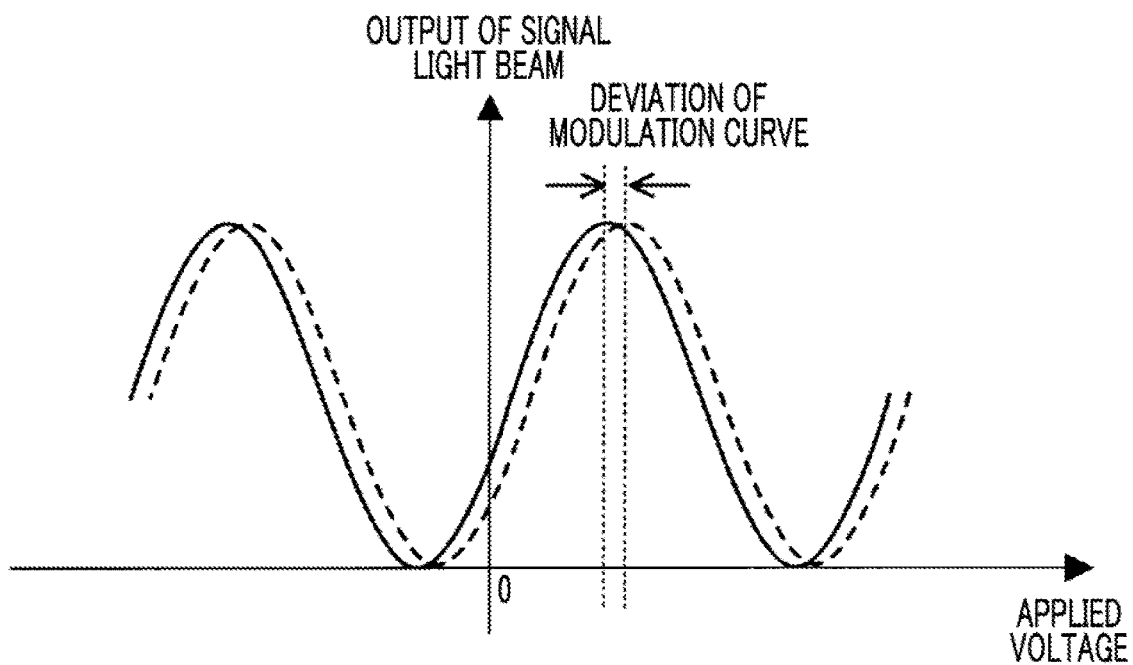
FIG. 8 is a view illustrating a deviation of a modulation curve.
Figure 10:
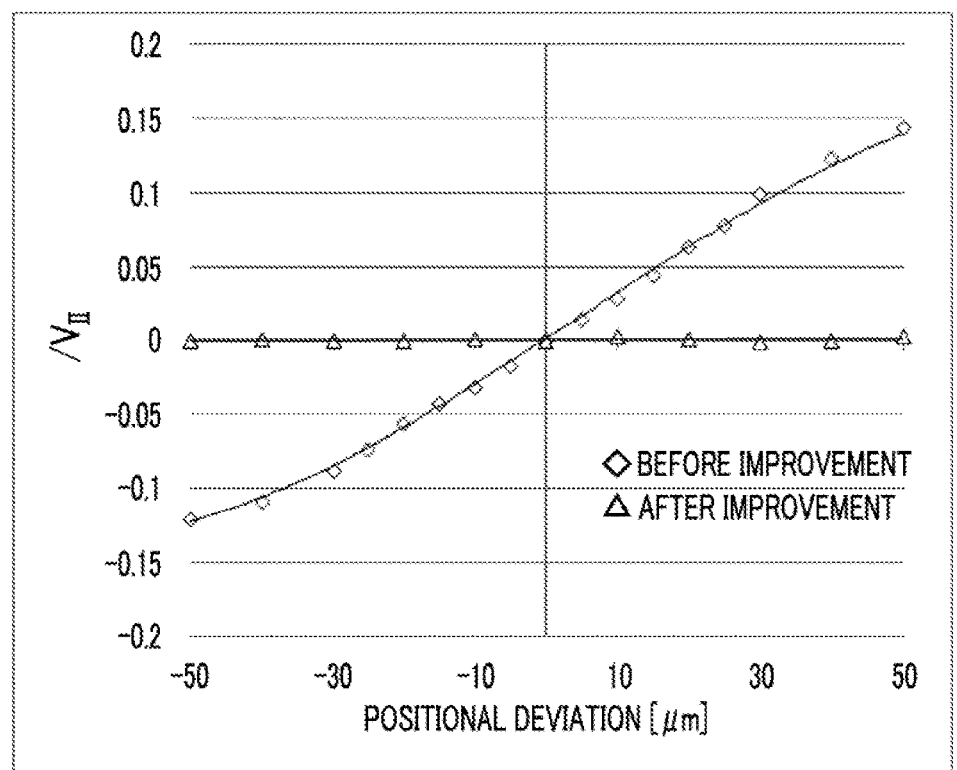
FIG. 10 is a graph illustrating a deviation of a modulation curve of an output light beam (signal light beam) in a case where the fiber collimator position is set to deviate.

Next, description will be given of a deviation of a modulation curve. Here, the deviation of the modulation curve represents a phenomenon in which a modulation curve of a signal light beam output is shifted with respect to an application voltage in accordance with a position of a fiber collimator, and a state of the deviation is illustrated in FIG. 8. FIG. 10 is obtained by measuring a deviation of a modulation curve of an output light beam (signal light beam) output from the optical fiber 7 with respect to a positional deviation of the fiber collimator. In a case where the unnecessary light beam removing unit and the light absorbing unit are not provided, it can be understood that the deviation of the modulation curve increases along with the positional deviation. In contrast, in a case where the unnecessary light beam removing unit is provided, it can be easily understood that the deviation of the modulation curve hardly varies with respect to the positional deviation, and occurrence of the deviation of the modulation curve due to mixing of a radiated light beam into a signal light beam is suppressed.

Figure 11:
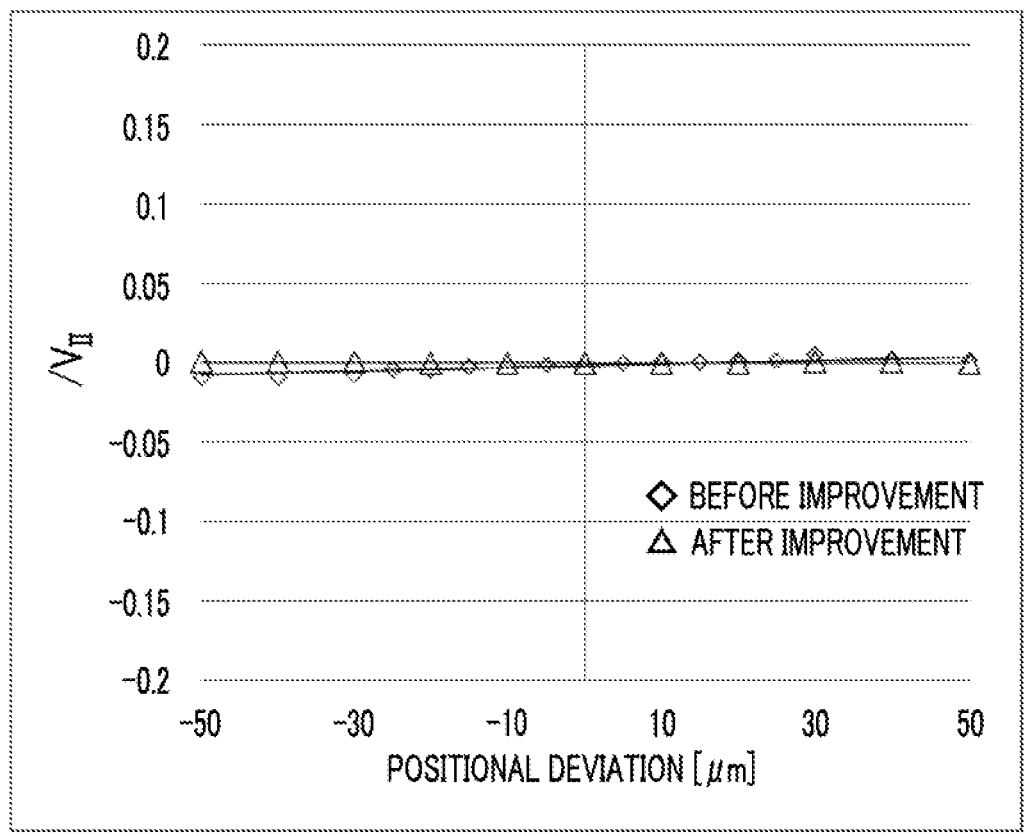
FIG. 11 is a graph illustrating a deviation of a modulation curve of a monitoring light beam (radiated light beam) in a case where the fiber collimator position is set to deviate.

FIG. 11 is obtained by detecting a radiated light beam at a light-receiving portion of a monitor and by investing a deviation of a modulation curve of a monitor signal that is output. From FIG. 11, it can be seen that the deviation of the modulation curve of the monitor signal according to a position of the fiber collimator does not occur in the radiated light beam, and occurrence of the phase difference between a signal light beam output and a monitor signal output as illustrated in FIG. 9 is caused by the deviation of the modulation curve of the signal light beam.

In the above description, assumption has been made on a case where the position of the fiber collimator is made to be deviated. However, even in a case where the first lens unit 3 is disposed to be deviated from the substrate 1, when the unnecessary light beam removing unit is provided, it is confirmed that the bias point shift phenomenon can be effectively suppressed.

As described above, according to the invention, it is possible to provide an optical element module in which mixing-in of an unnecessary light beam is suppressed, and thus occurrence of a bias point shift phenomenon is suppressed.

What is claimed is:

1. An optical element module, comprising:
    a substrate;
    an optical modulator unit that is formed in the substrate and includes an optical waveguide;
    a first lens unit that is disposed on an end surface of the substrate in direct contact, and includes a lens portion at which a signal light beam emitted from the optical modulator unit is collimated; and
    a second lens unit that introduces the signal light beam passing through the first lens unit to an optical fiber,
    wherein the optical modulator unit includes a Mach-Zehnder type optical waveguide,
    a Y-branch coupler of the Mach-Zehnder type optical waveguide includes an output waveguide through which a signal light beam is guided, and a radiated light beam waveguide through which a radiated light beam is guided,
    a light-receiving element disposed on the radiated light beam waveguide,
    an unnecessary light beam removing unit, which suppresses input of a higher-order mode light beam propagating through the output waveguide or a leaked light beam propagating through the inside of the substrate into the optical fiber through the lens portions of the first lens unit, is provided between the output waveguide and the radiated light beam waveguide and between the light-receiving element and an end of the substrate, and
    the unnecessary light beam removing unit is a slab waveguide that is formed on the substrate and is formed by a part in which the gap between the output waveguide and the slab waveguide is constant and the other part in which a gap between the output waveguide and the slab waveguide becomes wide toward the end surface of the substrate, and is formed so that a length of the part along the outside waveguide is smaller than the length of the other part along the outside waveguide, and is formed so that at the end surface of the substrate, a maximum value of the gap between the output waveguide and the slab waveguide is 2 times wider than a mode field diameter of the output waveguide and is formed to prevent the unnecessary light beam radiated from the end of the slab waveguide from being input to the optical fiber through the first lens unit and the second lens unit.

2. The optical element module according to claim 1, wherein a light absorbing unit is disposed on an upper side of the slab waveguide.

3. The optical element module according to claim 1, wherein the substrate is a thin plate having a thickness of 20 µm or less.

4. An optical element module, comprising:
    a substrate;
    two optical modulator units which are formed in the substrate and respectively include an optical waveguide;
    a first lens unit that is disposed on an end surface of the substrate in direct contact, and includes two lens portions at which two signal light beams emitted from the two optical modulator units are collimated;
    polarization combining means that combines the two signal light beams passing through the first lens unit in a state in which planes of polarization are orthogonal to each other; and
    a second lens unit that introduces a signal light beam obtained after combining by the polarization combining means to an optical fiber,
    wherein each of the optical modulator units includes a Mach-Zehnder type optical waveguide,
    a Y-branch coupler of the Mach-Zehnder type optical waveguide includes an output waveguide through which a signal light beam is guided, and a radiated light beam waveguide through which a radiated light beam is guided,
    a light-receiving element disposed on the radiated light beam waveguide,
    an unnecessary light beam removing unit, which suppresses input of a higher-order mode light beam propagating through the output waveguide or a leaked light beam propagating through the inside of the substrate into the optical fiber through the lens portions of the first lens unit, is provided between the output waveguide and the radiated light beam waveguide and between the light-receiving element and an end of the substrate, and
    the unnecessary light beam removing unit is a slab waveguide that is formed on the substrate and is formed by a part in which the gap between the output waveguide and the slab waveguide is constant and the other part in which a gap between the output waveguide and the slab waveguide becomes wide toward the end surface of the substrate, and is formed so that a length of the part along the outside waveguide is smaller than the length of the other part along the outside waveguide, and is formed so that at the end surface of the substrate, a maximum value of the gap between the output waveguide and the slab waveguide is 2 times wider than a mode field diameter of the output waveguide and is formed to prevent the unnecessary light beam radiated from the end of the slab waveguide from being input to the optical fiber through the first lens unit and the second lens unit.

5. The optical element module according to claim 4, wherein a light absorbing unit is disposed on an upper side of the slab waveguide.

6. The optical element module according to claim 4, wherein the substrate is a thin plate having a thickness of 20 µm or less.

* * * * *